United States Patent
Roth-Schuler et al.

(10) Patent No.: US 8,434,779 B2
(45) Date of Patent: May 7, 2013

(54) FIFTH WHEEL

(75) Inventors: Christian Roth-Schuler, Singen (DE); Dirk Schneider, München (DE)

(73) Assignee: SAF-HOLLAND Verkehrstechnik GmbH, Singen-Hohentwiel (DE)

(*) Notice: Subject to any disclaimer, the term of this patent is extended or adjusted under 35 U.S.C. 154(b) by 782 days.

(21) Appl. No.: 12/066,289

(22) PCT Filed: Jun. 10, 2006

(86) PCT No.: PCT/EP2006/005587
§ 371 (c)(1),
(2), (4) Date: Mar. 10, 2008

(87) PCT Pub. No.: WO2007/031124
PCT Pub. Date: Mar. 22, 2007

(65) Prior Publication Data
US 2008/0231018 A1   Sep. 25, 2008

(30) Foreign Application Priority Data
Sep. 15, 2005 (EP) ................................. 05020077

(51) Int. Cl.
*B62D 53/06* (2006.01)
(52) U.S. Cl.
USPC ........................................................ 280/433
(58) Field of Classification Search .................. 280/433, 280/438.1
See application file for complete search history.

(56) References Cited

U.S. PATENT DOCUMENTS

| | | | |
|---|---|---|---|
| 2,100,463 A * | 11/1937 | Wohlfarth | 280/438.1 |
| 2,306,459 A * | 12/1942 | Mennen | 280/439 |
| 2,454,626 A * | 11/1948 | Borzell | 280/432 |
| 2,791,286 A * | 5/1957 | Baster | 180/24.01 |
| 3,137,515 A * | 6/1964 | Masser | 280/440 |
| 3,357,371 A * | 12/1967 | Gutridge | 410/54 |
| 3,820,821 A * | 6/1974 | Leland | 280/423.1 |
| 3,854,423 A * | 12/1974 | Bridge | 410/54 |
| 4,017,095 A * | 4/1977 | Best | 280/438.1 |
| 5,449,191 A * | 9/1995 | Cattau | 280/438.1 |
| 5,765,849 A | 6/1998 | Moulton et al. | |
| 6,170,849 B1 * | 1/2001 | McCall | 280/433 |
| 6,213,492 B1 * | 4/2001 | Ceccarelli, III | 280/491.5 |
| 7,044,492 B1 * | 5/2006 | Andersson | 280/433 |
| 2003/0047906 A1 | 3/2003 | Hicks et al. | |
| 2003/0209879 A1 * | 11/2003 | Lindenman et al. | 280/438.1 |
| 2005/0167944 A1 * | 8/2005 | Audo et al. | 280/433 |
| 2006/0108770 A1 * | 5/2006 | Burns et al. | 280/433 |
| 2006/0170190 A1 | 8/2006 | Roth-Schuler et al. | |

FOREIGN PATENT DOCUMENTS

EP   0481928   4/1992

* cited by examiner

*Primary Examiner* — Tony H. Winner
*Assistant Examiner* — Daniel Yeagley
(74) *Attorney, Agent, or Firm* — Prince Heneveld LLP

(57) ABSTRACT

A fifth wheel comprises a coupling plate and at least two pillow blocks for the supported mounting of the coupling plate on a vehicle chassis of the tractor vehicle, the pillow block comprising a support region and a mounting region. The mounting region is designed for the detachable mounting of the pillow block to a transverse strut of the vehicle chassis of the tractor vehicle.

12 Claims, 4 Drawing Sheets

FIFTH WHEEL

BACKGROUND OF THE INVENTION

The invention relates to a fifth wheel, comprising a coupling plate and at least two bearing brackets for supportive mounting of the coupling plate on a vehicle chassis frame of the tractor vehicle, the bearing bracket having at least one support area and one mounting area.

In motor vehicle transport increasing use is being made of towing combinations having fifth wheels. The combination consists of a tractor vehicle and at least one trailer. The tractor vehicle has a coupling plate, into which a pin, the so-called kingpin, of the trailer is inserted and coupled. The coupling plate is supportively connected to the vehicle chassis frame of the tractor vehicle. The bearing brackets contain bearing elements, which allow the coupling plate to pivot transversely to the direction of travel of the tractor vehicle.

WO 2004/052713 A2 discloses a fifth wheel of generic type. The coupling plate is connected to the vehicle chassis frame by bearing brackets. The mounting area of the bearing bracket is laterally fixed to the vehicle chassis frame by means of bolts. The lateral forces exerted on the coupling plate by the trailer are fully absorbed by the support area of the bearing bracket. The bearing bracket itself is an integrally formed casting.

Proceeding from the state of the art, the object of the present invention is to specify a fifth wheel, which is as simple to manufacture as possible, which is as lightweight as possible and which can transmit the greatest possible forces between the trailer and the tractor vehicle.

SUMMARY OF THE INVENTION

The object is achieved by a fifth wheel comprising a coupling plate and at least two bearing brackets for supportive mounting of the coupling plate on a vehicle chassis frame of the tractor vehicle, the bearing bracket having a support area and a mounting area, the mounting area for detachable mounting of the bearing bracket being formed on a transverse strut in the vehicle chassis frame of the tractor vehicle.

It is advantageous for the vehicle chassis frame itself to be strengthened, rather than weakened, by the attachment of the fifth wheel. This is achieved in that the mounting area of the bearing bracket is designed for detachable mounting on a transverse strut of the vehicle chassis frame. This is also achieved in that the mounting area is formed on a gusset plate between the transverse strut and the vehicle chassis frame. Attaching the fifth wheel directly to the vehicle chassis frame achieves a direct and precisely defined direction of the trailer forces acting on the tractor vehicle.

It is also advantageous for the mounting of the bearing bracket to be as easily fitted and detached as possible. This is achieved in that the transverse strut is embodied as a U-profile member.

It is furthermore advantageous for the forces that have to be transmitted between the tractor vehicle and the trailer, and vice versa, to be introduced as directly as possible into the vehicle chassis frame of the tractor vehicle. This is achieved in that the mounting area of the bearing bracket has a U-shaped foot section, the legs of the U-shape being designed to interlock positively around the transverse strut.

BRIEF DESCRIPTION OF THE DRAWINGS

Three exemplary embodiments of the invention will be described with reference to the drawings, in which.

DETAILED DESCRIPTION

Figure 1:
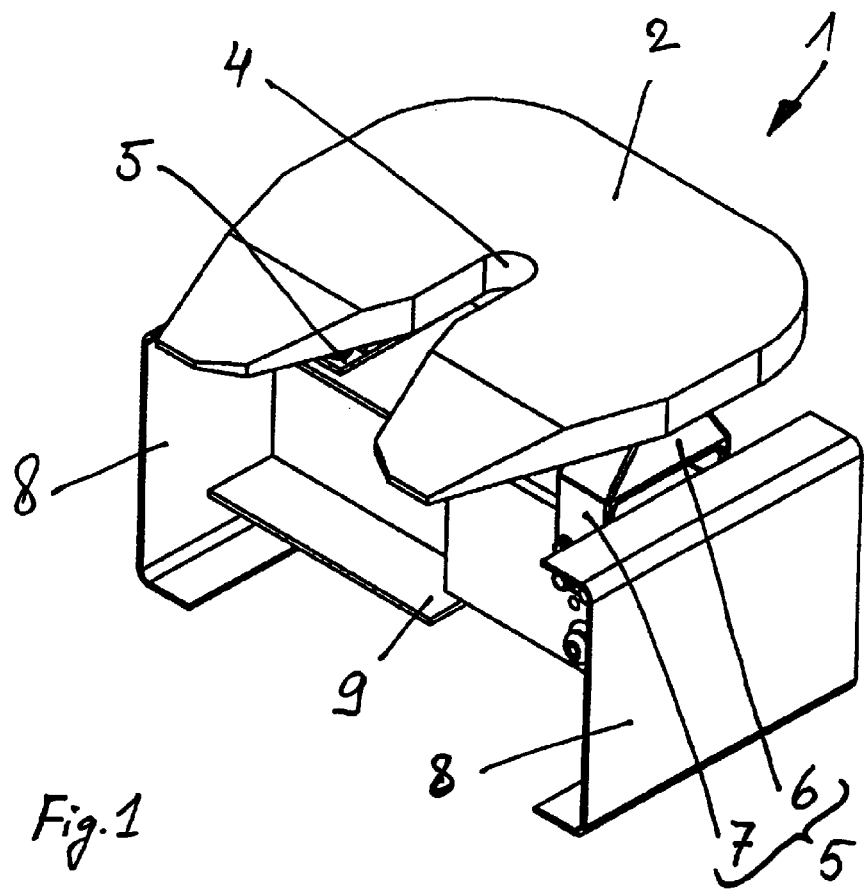
FIG. 1 shows a perspective view of a fifth wheel according to the invention with different left and right-hand variants of the attachment.

FIG. 1 shows a perspective, schematic representation of a fifth wheel 1. In FIG. 1 the fifth wheel 1 is represented with two different exemplary embodiments of the attachment. The fifth wheel 1 comprises a coupling plate 2 with an insertion opening 4 for the kingpin of the trailer, which has not been shown here. The coupling plate 2 is supportively mounted on two bearing brackets 5. The bearing bracket 5 serves for supportive seating of the coupling plate 2 and for detachable mounting on a vehicle chassis frame. The bearing bracket 5 comprises an upper support area 6 and a lower mounting area 7. In FIG. 1, two sections 8 of the longitudinal members of the vehicle chassis frame are shown running in the direction of travel. A transverse strut 9 is arranged between the sections 8 of the longitudinal members of the vehicle chassis frame.

To facilitate comparison of the two exemplary embodiments, the bearing bracket 5 and the transverse strut 9 are represented differently on the left-hand side and on the right-hand side of the vehicle chassis frame 8, viewed in the direction of travel. In reality, the transverse strut 9 is of identical design on left and right-hand sides and the bearing brackets 5 are identical or mirror symmetrical. A completely identical design of the left-hand and right-hand bearing brackets 5 is advantageous, because the two parts are interchangeable and only one part has to be manufactured during production. The transverse strut may also be designed with any other cross-section, for example as a casting or formed part made from sheet steel.

Figure 2:
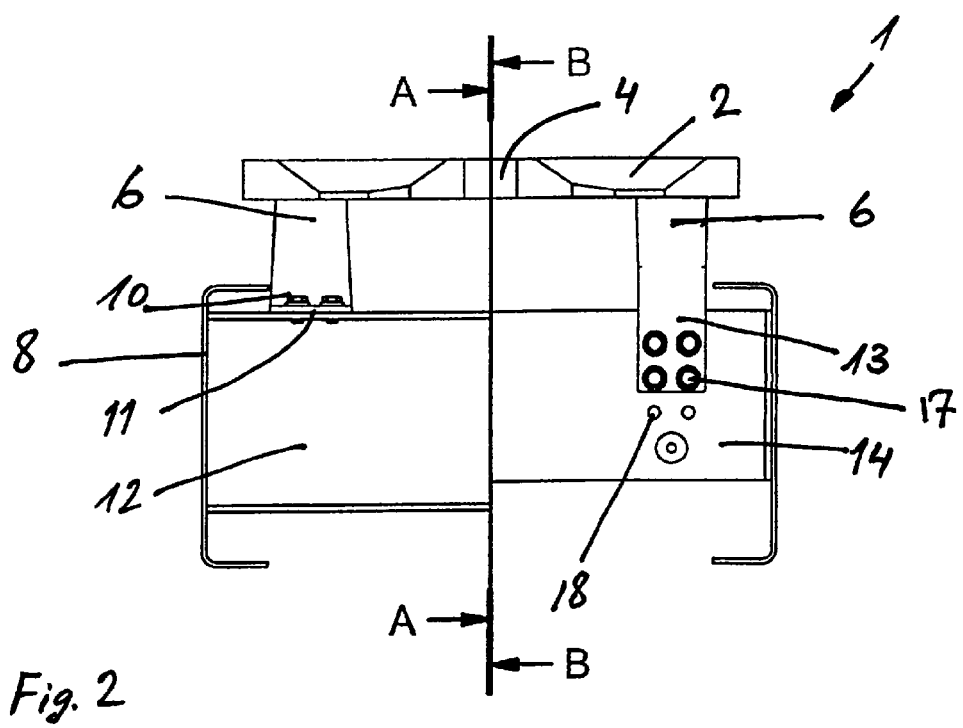
FIG. 2 shows a view of the fifth wheel in FIG. 1, viewed in the direction of travel.

FIG. 2 shows the fifth wheel in FIG. 1 again, viewed in the direction of travel. On the left-hand side the bearing bracket 5 is formed with a T-shaped foot section 10. The web 11 of the T-shaped foot section 10 rungs horizontally and parallel to the upper side of the transverse strut 9. On the left-hand side the transverse strut 9 is formed as a double T-profile member 12.

On the right-hand side the bearing bracket 5 is formed with a U-shaped foot section 13. The transverse strut 9 is likewise designed as a U-profile member 14. The legs 15, 16 of the U-shaped foot section 13 grip with a positive interlock around the U-profile member 14. In the U-shaped configuration of the foot section 13 and the transverse strut 14, the bearing faces between the bearing bracket and the transverse strut are larger than in the case of the T-shaped design. The detachable attachment between the coupling plate 2 and the vehicle chassis frame 8 is made by bolts 17 and holes 18, which are disposed running in the direction of travel. The forces acting on the fifth wheel 1 when in motion can be distributed over a larger acting area and over more bolted connections. Because a larger area is available, this type of attachment can be more readily adapted to different types of vehicle chassis frame 8.

Figure 3:
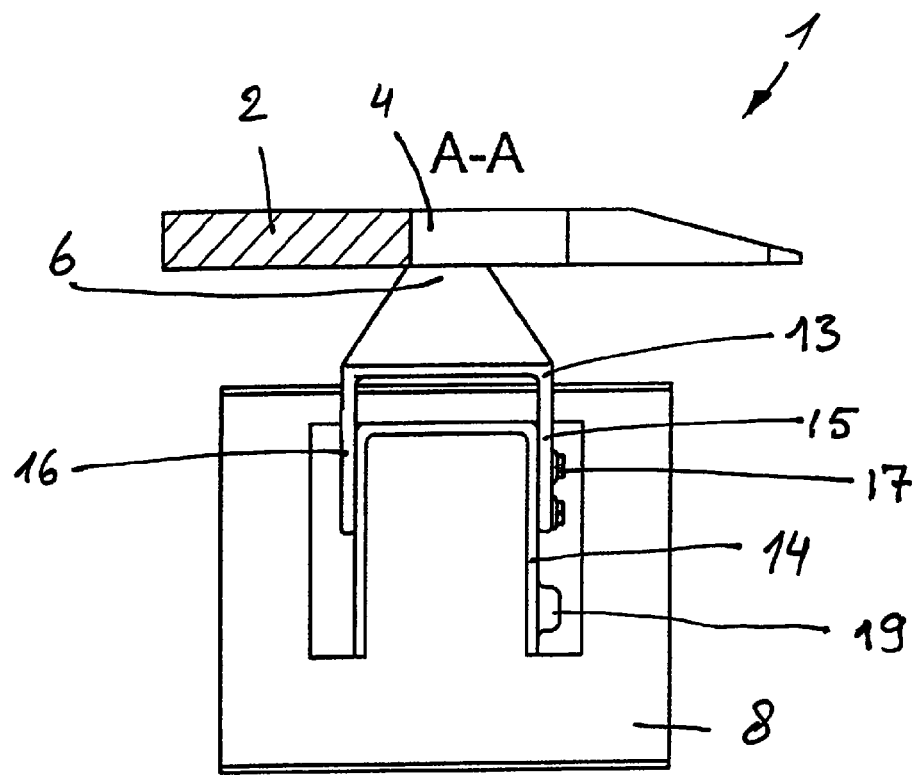
FIG. 3 shows a section through a fifth wheel according to the first variant of the attachment.
Figure 4:
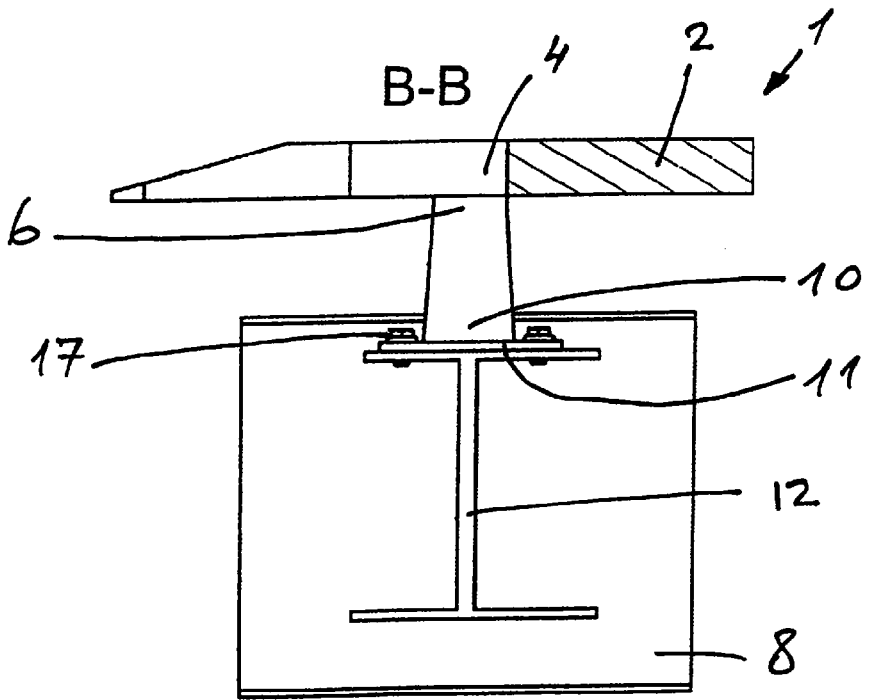
FIG. 4 shows a section through a fifth wheel according to the second variant of the attachment.

In FIGS. 3 and 4 the fifth wheel 1 is shown divided along the center line in the direction of travel. In FIG. 3 the fifth wheel 1 is shown according to a first exemplary embodiment with U-shaped members 13, 14, and in FIG. 4 the fifth wheel is shown according to the second exemplary embodiment with T-shaped members 10, 12.

Figure 5:
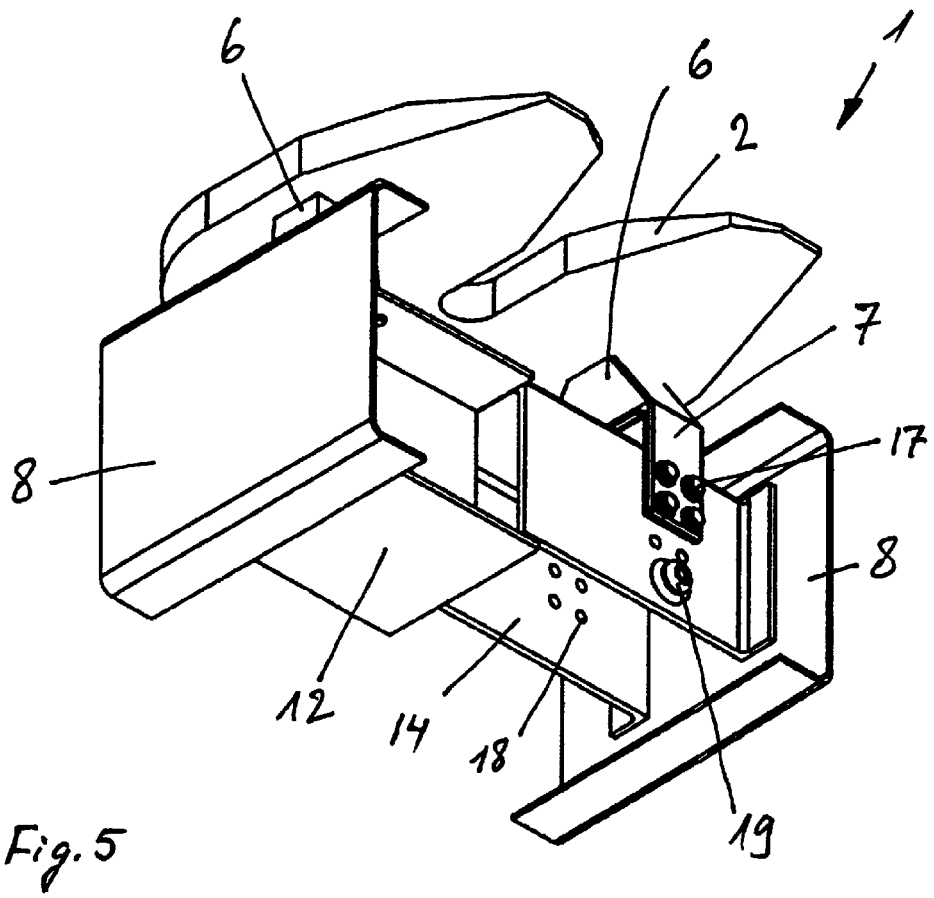
FIG. 5 shows a further perspective view of the fifth wheel in FIG. 1.

FIG. 5 again shows a perspective view of the fifth wheel 1 in FIG. 1 from the underside of the vehicle chassis frame 8. A mounting point 19 for the suspension of the rear axle is shown on the U-profile member 14.

Figure 6:
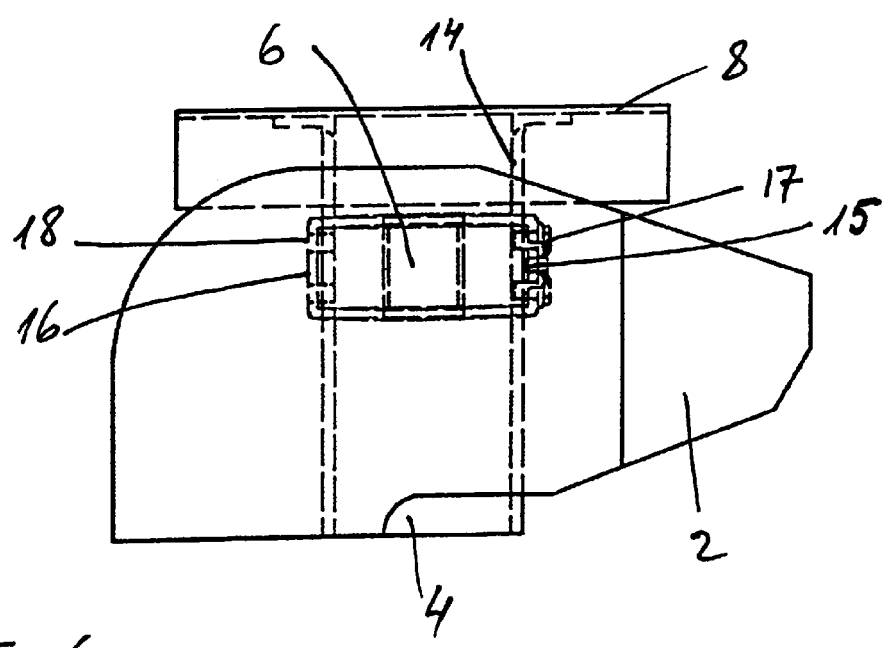
FIG. 6 shows a view of the fifth wheel in FIG. 3, viewed from above

FIG. 6 shows the right-hand half of the fifth wheel 1 viewed from above. It can be seen from FIG. 6 how the foot section 13 with the legs 15, 16 of the bearing bracket 5 positively interlocks around the U-profile member 14 and how the bolts 17 and holes 18 are arranged on both sides of the U-shaped transverse strut 14.

Figure 7:
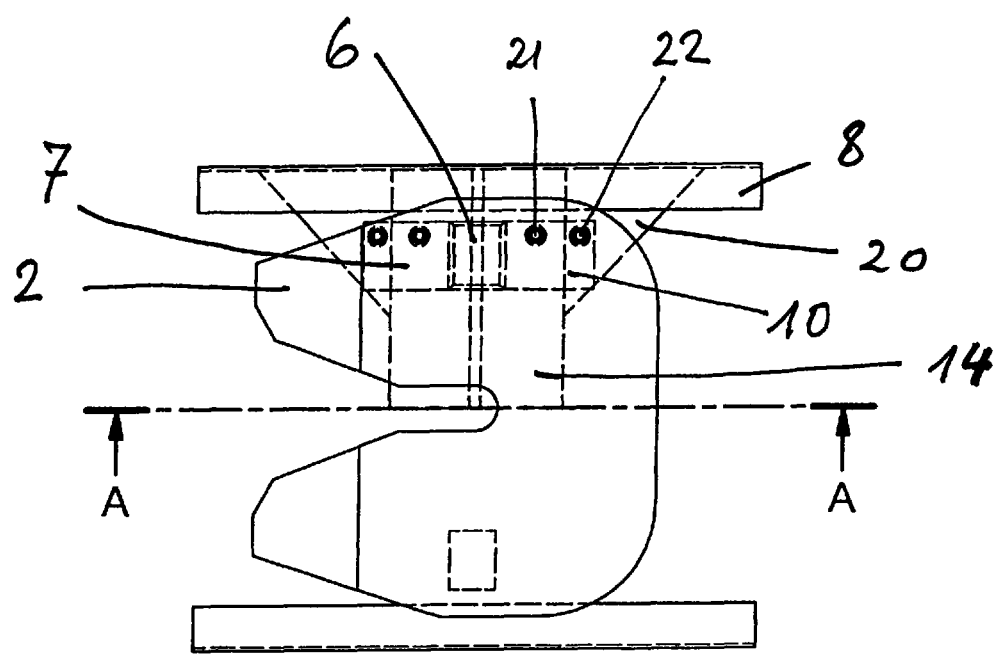
FIG. 7 shows a further view of a fifth wheel with a gusset plate for the direct attachment.

FIG. 7, in a further exemplary embodiment, shows how the mounting area 7 is connected to a gusset plate 20 between the transverse member 14 and the vehicle chassis frame 8. The T-shaped foot section 10 is connected by means of bolts 21, 22 both to the transverse strut 14 and to the gusset plate 20. The gusset plate 20 itself may be welded to the vehicle chassis frame 8.

Overall, the attachment of the fifth wheel 1 to a transverse strut 9, 12, 14 in the vehicle chassis frame 8 is easy to make, it is capable of absorbing large forces and it can be adapted to different types of vehicle chassis frame 8.

The invention claimed is:

1. A fifth wheel comprising a coupling plate and at least two bearing brackets for mounting the coupling plate on a vehicle chassis frame,
   wherein the vehicle chassis frame comprises a pair of longitudinally extending frame members, each of the longitudinal extending frame members comprise a top edge, a bottom edge and an inner side surface, and a transverse strut,
   wherein the transverse strut extends between and is coupled to the inner surface of each frame member, and wherein at least a portion of the transverse strut is disposed between the top edge and the bottom edge of the pair of longitudinally extending frame members,
   wherein the bearing brackets each have a support area and a mounting area, and wherein the bearing brackets are detachably mounted directly via their mounting areas on the transverse strut,
   wherein the mounting area of each bearing bracket has a U-shaped foot section having legs, wherein the legs interlock positively around the transverse strut.

2. The fifth wheel as claimed in claim 1, wherein each leg includes holes accepting fasteners therethrough, with the holes and fasteners being disposed in a direction of travel of a vehicle having the vehicle chassis frame.

3. The fifth wheel as claimed in claim 1, wherein the transverse strut is an inverted U-profile member.

4. The fifth wheel as claimed in claim 1, wherein each bearing bracket is attached to only one transverse strut.

5. The fifth wheel as claimed in claim 1, wherein each U-shaped foot section has an opening directly downwardly in a direction away from the coupling plate, with the legs of each U-shaped foot section being positioned on and detachably mounted to opposite sides of the transverse strut.

6. A fifth wheel comprising a coupling plate and at least two bearing brackets for mounting the coupling plate on a vehicle chassis frame,
   wherein the vehicle chassis frame comprises a pair of longitudinally extending frame members, each of the longitudinal extending frame members comprise a top edge, a bottom edge and an inner side surface, and a transverse strut,
   wherein the transverse strut extends between and is coupled to the inner surface of each frame member, and wherein at least a portion of the transverse strut is disposed between the top edge and the bottom edge of the pair of longitudinally extending frame members,
   wherein the bearing brackets have each a support area and a mounting area, and wherein the bearing brackets are detachably mounted directly via their mounting areas on the transverse strut,
   wherein the mounting area of each bearing bracket has a U-shaped foot section having legs, wherein the legs interlock positively around the transverse strut, and
   wherein each leg includes holes accepting fasteners therethrough, with the holes and fasteners being disposed in a direction of travel of a vehicle having the vehicle chassis frame.

7. The fifth wheel as claimed in claim 6, wherein the transverse strut is an inverted U-profile member.

8. The fifth wheel as claimed in claim 6, wherein each bearing bracket is attached to only one transverse strut.

9. The fifth wheel as claimed in claim 6, wherein each U-shaped foot section has an opening directly downwardly in a direction away from the coupling plate, with the legs of each U-shaped foot section being positioned on and detachably mounted to opposite sides of the transverse strut.

10. A vehicle comprising: a vehicle chassis frame comprising a pair of longitudinally extending frame members, each of the longitudinal extending frame members comprise a top edge, a bottom edge and an inner side surface, and a transverse strut,
    wherein the transverse strut extends between and is coupled to the inner surface of each frame member, and wherein at least a portion of the transverse strut is disposed between the top edge and the bottom edge of the pair of longitudinally extending frame members; and
    a fifth wheel comprising a coupling plate and at least two bearing brackets mounting the coupling plate on the vehicle chassis frame;
    wherein the bearing brackets have each a support area and a mounting area; and wherein the bearing brackets are detachably mounted directly via their mounting areas on the transverse strut;
    wherein the mounting area of each bearing bracket has a U-shaped foot section having legs, wherein the legs interlock positively around the transverse strut; and
    wherein each leg includes holes accepting fasteners therethrough, with the holes and fasteners being disposed in a direction of travel of the vehicle.

11. The fifth wheel as claimed in claim 10, wherein:
    each U-shaped foot section has an opening directly downwardly in a direction away from the coupling plate, with the legs of each U-shaped foot section being positioned on and detachably mounted to opposite sides of the transverse strut.

12. The fifth wheel as claimed in claim 10, wherein:
    each bearing bracket is attached to only one transverse strut.

* * * * *